March 1, 1966 — P. T. DAY, JR — 3,237,546
HEATING, COOLING AND VENTILATING SYSTEM
Filed June 22, 1962 — 3 Sheets-Sheet 1

INVENTOR
PAUL T. DAY, Jr.
BY Garney & Garney
ATTORNEYS

March 1, 1966 P. T. DAY, JR 3,237,546
HEATING, COOLING AND VENTILATING SYSTEM
Filed June 22, 1962 3 Sheets-Sheet 2
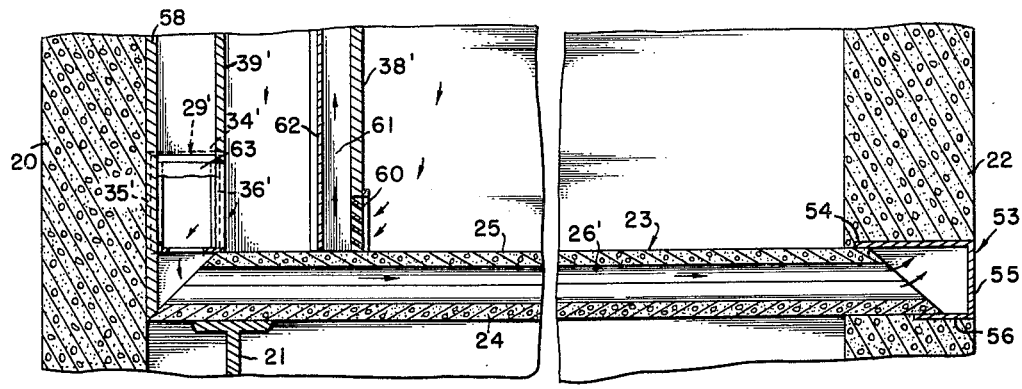
FIG. 7.
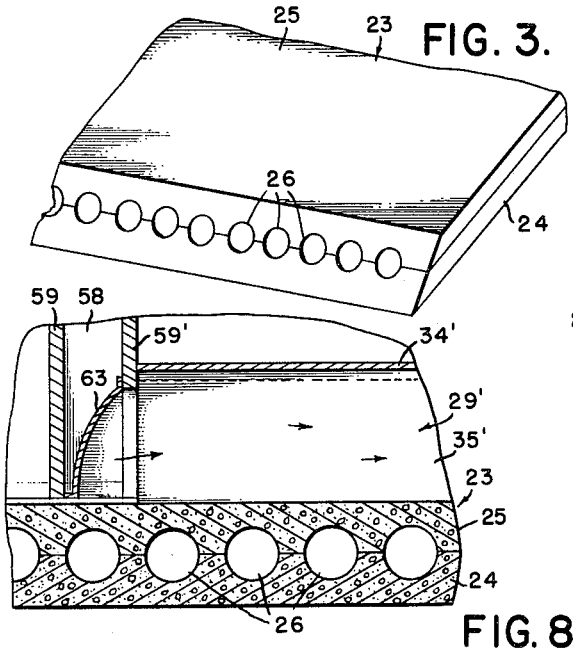
FIG. 3.
FIG. 8.
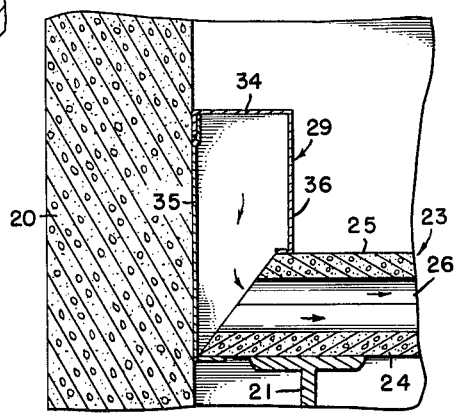
FIG. 4.
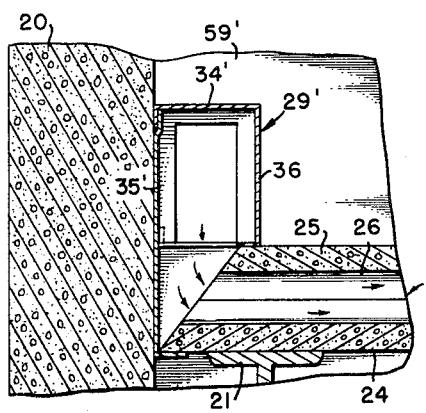
FIG. 9.
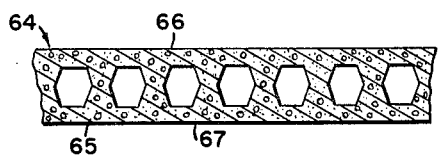
FIG. 10
INVENTOR.
PAUL T. DAY Jr.
BY
Garvey & Garvey
ATTORNEYS

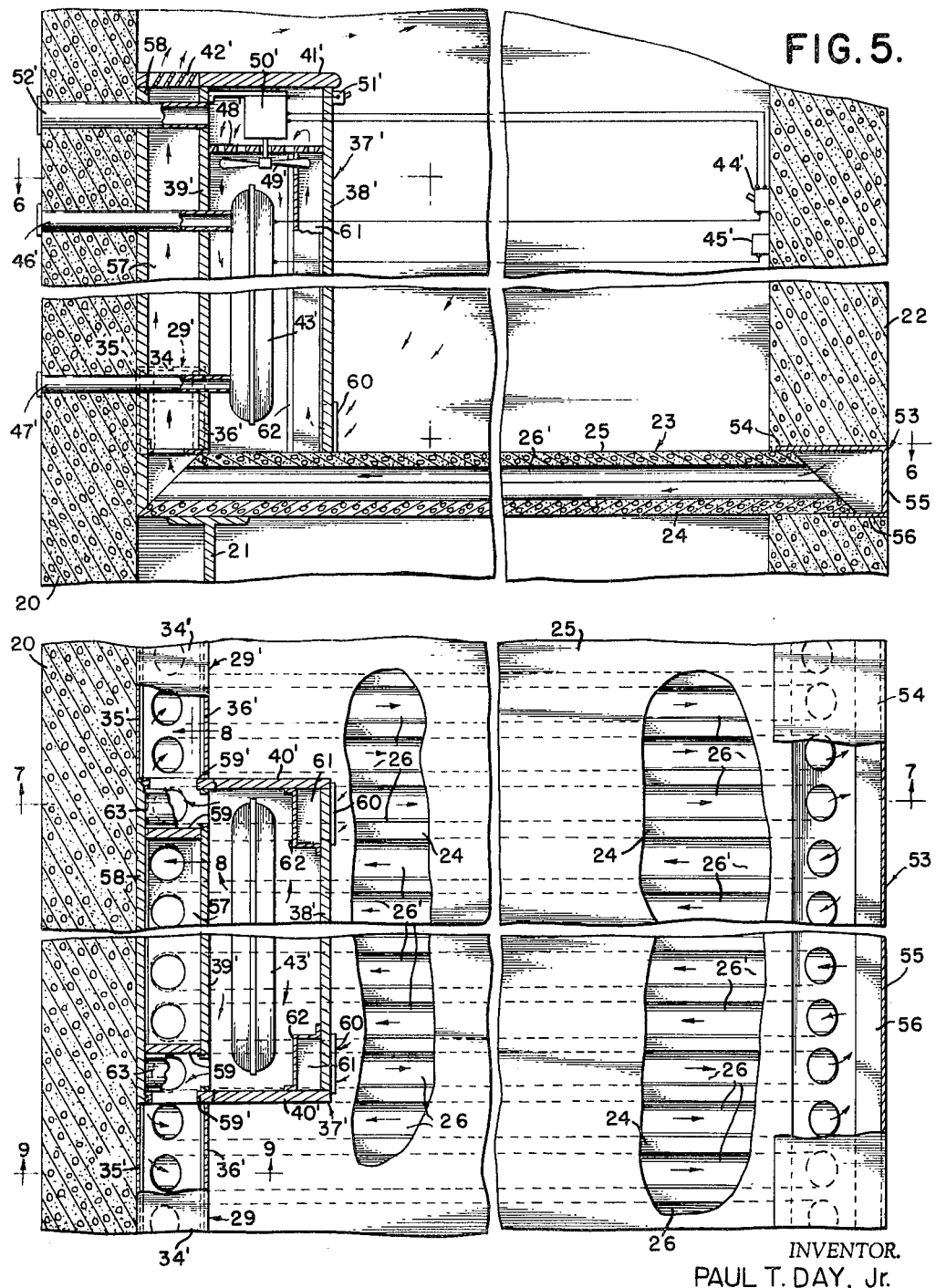

United States Patent Office 3,237,546
Patented Mar. 1, 1966

3,237,546
HEATING, COOLING AND VENTILATING
SYSTEM
Paul T. Day, Jr., Baltimore, Md., assignor to American
Metalcore Systems, Inc., Baltimore, Md.
Filed June 22, 1962, Ser. No. 204,383
5 Claims. (Cl. 98—33)

This invention relates to a heating, cooling and ventilating system for a building and is a continuation-in-part of abandoned application, Serial Number 851,844, filed November 9, 1959.

It is an object of this invention to provide a combination radiant heating and forced air ventilating system, a combined air conditioning and ventilating system, or ventilating system, carried out by means of common equipment, parts of which are selectively operable to effect the desired heating, cooling or ventilation of a room or area of a building.

Another object is to provide a system of the character described, including a floor or floor/ceiling, having incorporated therein, a plurality of conduits coextensive with the room or area to be heated or cooled, through which the air passes to effect radiant heating or cooling of the floor surface at an even temperature throughout.

Other objects are to provide a floor structure having a plurality of air conduits, the floor structure comprising upper and lower sections, the upper portion of which is constructed of a reflective material and the lower portion being reflective or having insulating properties; to provide a system of the character described wherein air passing through the floor conduits is forced into the room area for heating or cooling the latter, and then returned to an air-treating unit for heating or cooling and re-circulation; to provide a system for introducing fresh air to the circulatory supply system of the room or area which may be re-circulated with the heated or cooled air, or may be re-circulated independently; and to provide a practical and economical system of the character described, which may be readily installed in a room or area of a building, without the usual time-consuming operations heretofore required.

Other objects of the invention will be manifest from the following description of the present preferred forms of the invention, taken in connection with the accompanying drawings, wherein:

FIG. 3 is a fragmentary perspective view of a floor unit constructed in accordance with the present system;

FIG. 4 is an enlarged sectional view of the header duct illustrating the manner of delivering air to the floor unit;

FIG. 5 is a fragmentary sectional view of a modified heating, cooling or ventilating system, showing to advantage the manner of circulating air in an area of a building;

FIG. 6 is a fragmentary sectional view taken along the lines 6—6 of FIG. 5, looking in the direction of the arrows, portions thereof being broken away to disclose details of construction;

FIG. 7 is a fragmentary sectional view taken along the lines 7—7 of FIG. 6, looking in the direction of the arrows and showing to advantage the direction of movement of air through the system;

FIG. 8 is an enlarged fragmentary sectional view taken along the lines 8—8 of FIG. 6, looking in the direction of the arrows;

FIG. 9 is an enlarged sectional view taken along the lines 9—9 of FIG. 6, looking in the direction of the arrows; and FIG. 10 is a fragmentary sectional view of a modified form of a floor unit.

Figures 1, 2:
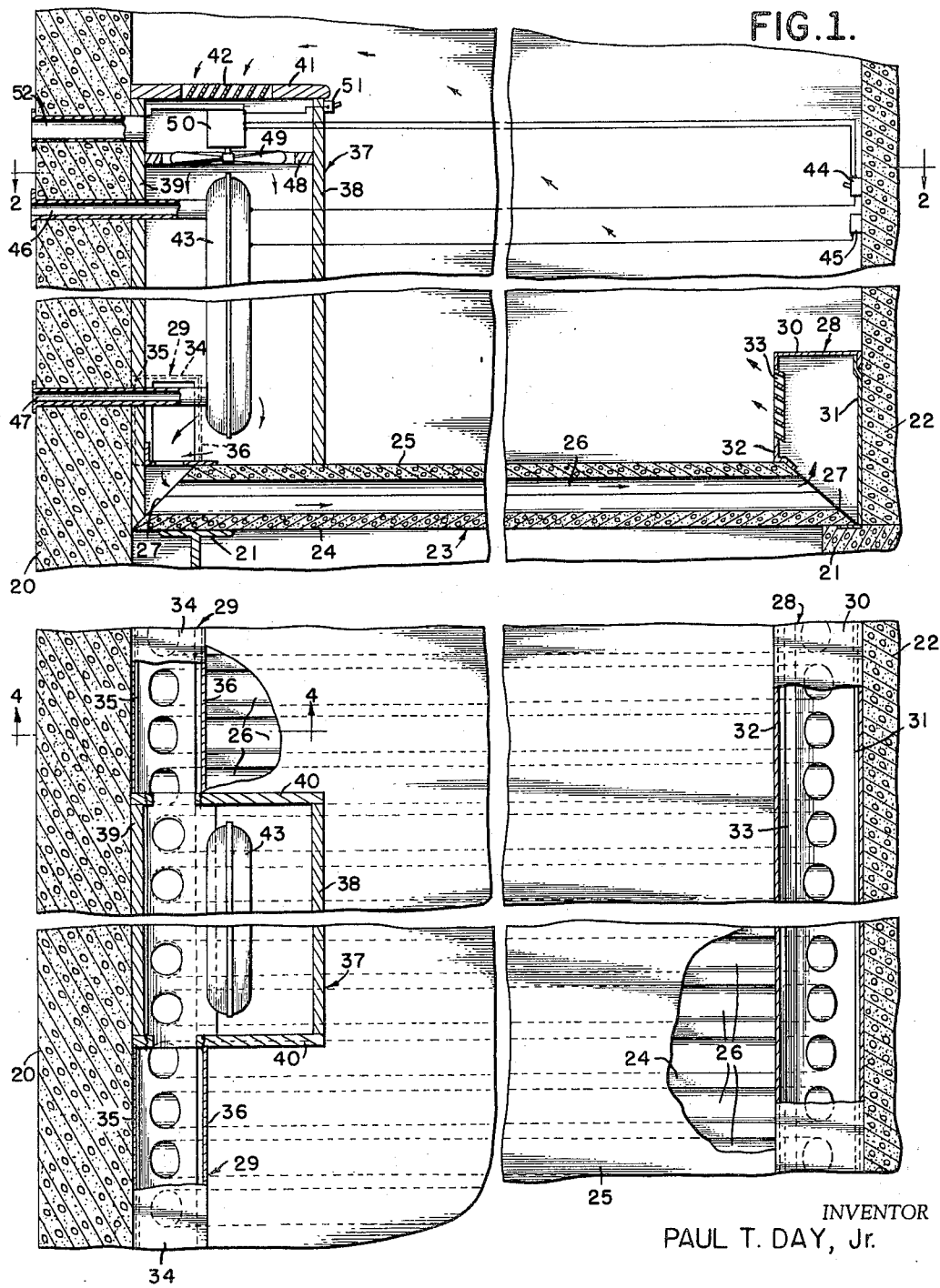
FIG. 1 is a fragmentary sectional view of an area of a building equipped with the present system, for heating, cooling or ventilating air in an area of a building, showing to advantage the manner of circulating air through the system.
FIG. 2 is a fragmentary sectional view taken along the lines 2—2 of FIG. 1, looking in the direction of the arrows.

Referring now in greater detail to the form of invention illustrated in FIGS. 1 through 4, the present system is shown installed in an area of a building which includes an outer wall 20, floor supports 21, and an inner wall 22. Supports 21 are adapted to hold a plurality of combination floor and duct panels 23. Each panel 23 includes a lower portion 24 which is preferably made of an insulating cementitious material such as Thermo-Con, and an upper portion 25, constructed of a reflective cementitious material. As shown to advantage in FIG. 3, each panel 23 is provided with a plurality of central longitudinally extending ducts or conducts 26 of any desired shape, formed between the upper and lower portions of the panel in any desired manner. The opposite ends of the panels are beveled, as indicated at 27, to facilitate connection thereof with trunk lines or header ducts 28 and 29, which are coextensive with the beveled panel terminals 27. Header duct 28 is of generally box-like configuration, including a top 30, a back 31, and a front 32, which are connected to panels 23 in any suitable manner. Front 32 of header duct 28 is provided with a grille 33 which permits air flowing through duct 26 of panels 23 into the header duct, to be expelled through the grille into the room area. If desired, the grille may be located in top 30.

Header duct 29 is also of box-like configuration and includes a top 34, a back 35 and a front 36, connected to panels 23, the bottom of which duct is open for communication with longitudinal ducts 26 of floor panels 23.

In accordance with the objects of the present invention, there is provided a heating, cooling and ventilating plenum 37 which is positioned against wall 20. Plenum 37 includes a front wall 38, a rear wall 39, side walls 40 and a top 41, the latter being provided with a grille 42. Duct 29 which is coextensive with floor panels 23 passes through sides 40 of the plenum, and that portion of the duct within the plenum is in communication with the interior of the plenum by virtue of a perforated wall section therein. A conventional combination heating and cooling unit 43 of any desired size, is mounted within plenum 37 and electrically connected to a switch 44 and thermostat 45, which may be mounted on inner wall 22. Switch 44 controls selective operation of the cooling or heating functions of unit 43. An exhaust duct, indicated at 46 and an air supply duct designated 47 are in communication with unit 43. Superjacent unit 43 is a centrally perforated grille 48 in which is located a fan 49 driven by suitable motive means 50. Switch 44 and thermostat 45 also control operation of fan 49, the latter being run at a faster rate of speed during the air conditioning operation than during a heating operation. A manual fan control switch is indicated at 51 for operating the fan independently of unit 43, to ventilate the room or area.

A fresh air intake 52, located in outside wall 20 is in communication with the interior of plenum 37 at a point between top 41 and fan 49, for admixing fresh air with the circulated air drawn through grille 41.

In use, when the system of the present invention is to be operated for heating or cooling, thermostat 45 is set at the desired temperature and switch 44 actuated for the selected function. This actuates fan 49 and forces air past unit 43 to heat or cool the latter, depending upon the particular function for which switch 44 is set. The treated air moves through the perforated wall section into header duct 29 and spreads outwardly away from plenum 37 and thence into multiple conduits 26 of panels 23. As the treated air moves through the ducts, it heats or cools the reflective upper portion 25 of each panel, thereby uniformly heating or cooling the entire floor surface of the room or area. In this form of the invention, the heating or cooling effect is intensified because of the insulating nature of lower portion 24 of each panel, so that the heating or cooling effect is concentrated on the floor surface. As the air reaches the far extreme of panels 23, it enters duct 28 which is also coextensive with and at right angles to the panels. This air is then expelled through grille 33 in the front wall of header duct 28 into the room or area for directly heating or cooling the same. The air in the room is circulated and drawn by fan 49 through grille 42 into plenum 37, where it is mixed with fresh air entering fresh air intake 52 and the heating or cooling cycle is then repeated.

In the event it is only desired to ventilate the room or area, unit 43 is not actuated and fan 49 is operated by manual switch 50. This produces circulation of the air in the same manner above described in connection with the heating and cooling operation, to maintain a constant circulation of air and admixture with fresh air entering the plenum through air intake 52.

In FIGS. 5 through 9, there is shown a modified form of the present system wherein air is delivered to the room at the locus of the outer wall thereof. In this form of the invention, floor panels 23 are of the same construction as set out above in connection with the form of invention illustrated in FIGS. 1 through 4. In this form of the invention however, the panels are extended to a point within interior wall 22 where they are in communication with a header duct 53 which also lies within the confines of the inner wall 22. Duct 53 includes a top 54, a back 55, a front 56, and a bottom 57, which opens into ducts 26 of panels 23, and are coextensive with the panels. Header duct 53 retains the air rather than expelling it into the room or area.

At the opposite end of panels 23, remote from duct 53 is a duct 29', similar in construction to duct 29 of the form of invention illustrated in FIGS. 1 to 4, like parts of which are identified by like primed numbers. Adjacent duct 29' is a heating and cooling and ventilating plenum 37', including a front wall 38', a rear wall 39', side walls 40' and a top wall 41'. It will be noted from a consideration of FIGS. 5 and 6, that plenum 37' is spaced from outside wall 20 to form a room vent stack 57 between a wall 58 contiguous with outer wall 20 and plenum 37'. Spaced inner and outer side walls for the vent stack are indicated at 59 and 59' through which walls, duct 29' passes. A ventilating grille 42' is positioned superjacent vent stack 57 to permit passage of air flowing up the vent stack to be admitted into the room or area.

Spaced return vents 60 are positioned in front wall 38' near its lower extremity, to permit air from the room or area to pass into return stacks 61 formed between walls 38' and an inner wall 62.

A conventional combination heating and cooling unit 43' of any desired size is mounted within plenum 37' between walls 39' and 62 and electrically connected to a switch 44' and thermostat 45' mounted on inner wall 22. An exhaust duct for the heating and cooling unit 43' is indicated at 46' and an air supply duct is shown at 47'. Above unit 43' is a centrally perforated grille 48' in which is positioned a fan 49' driven by suitable motive means 50'. A manual fan control switch is designated 51'. Fresh air intake 52' in outside wall 20 communicates with the interior of plenum 37' at a point between top 41' and fan 49'.

It is within the contemplation of this form of the present invention to direct air which has been heated or cooled by unit 43' only to those conduits of panels 23 which lie laterally of plenum 37'. For carrying out this purpose, there is provided an arcuate plate 63 between vent stack 57 and the interior of plenum 37' for preventing admixture of air in stack 57 and that air flowing past heating and cooling unit 43' (see FIG. 8).

Operation of the heating and cooling unit is initiated in the same manner as above described in connection with the form of FIGS. 1 through 4. Air which has been heated or cooled by unit 43' passes downwardly through lateral openings in rear wall 39' of plenum 37' between walls 59 and 59' into duct 29'. The air is then directed into conduits 26 of panels 23 which lie laterally adjacent plenum 37'. As indicated in FIG. 6, air passing through conduits 26 moves across the room to duct 53 whereupon it is directed back towards vent stack 57 through conduits 26' of centrally located panels 23. The air passes upwardly through stack 57, past grille 42' to the room or area.

The actuation of fan 49' causes air from the room or area to be drawn through return vents 60 into return stacks 61, from which point the air is drawn upwardly through grille 48'. The returned air is then mixed with fresh air entering through fresh air intake 52'. The air mixture is next drawn downwardly by fan 49' past heating and cooling unit 43' and the heating or cooling cycle is repeated.

When it is desired to ventilate the room or area without producing a heating or cooling effect therein, fan switch 51' is actuated to circulate the air mixture comprising air from the room and fresh air from the outside. This admixture is circulated in the same manner as above described in connection with heated or cooled air.

FIG. 9 illustrates a modified form of panel, particularly adapted for radiantly heating both a room above and a room below the floor surface. In this form of the invention, the panel is designated 64 and includes a lower portion 65, an upper portion 66, and conduits 67 extending longitudinally through the panel. Both lower portion 65 and upper portion 66 are constructed of a reflective material, preferably concrete, which allows heat or cold to be transmitted to the room or area by the surface thereof. Where an insulating effect is desired, lower portion 65 and upper portion 66 may be made of an insulating concrete material.

Panels 23 comprising the floor surface forming a part of the present invention may be made in any suitable manner and may be either partially or wholly fabricated on the job site. In other words, when concrete is employed, the lower portion may be preformed and the upper portion thereof poured at the job site if desired. The panel conduits may be formed in any suitable manner such as by placing tubular members made of carboard or other material in the concrete. After the concrete of the panel has hardened, the cardboard may be eliminated by passage of a suitable acid through the conduits, to destroy the cardboard in a well known manner. The beveled ends of the floor panels permit them to be readily positioned and provide immediate access to the header ducts without the necessity of cutting through the panels for communication between the air conduits and the header ducts.

The system of the present invention eliminates the need for a central heating system including a heating plant, boiler room, stack and trunk lines, or means to conduct air or water to the individual rooms or areas to be heated. It additionally eliminates the need for a separate ventilating system and complies with existing building codes which prohibit the mixing of air from one room or area with that of another. Individual thermostatic control for each room or area is also effected. With the system of the present invention, effective means are provided for radiantly heating or cooling the entire surface of the floor uniformly. With this system also, the same equipment is employed for either heating and ventilating; cooling or ventilating; or ventilating an area by selective operation of various parts thereof.

While I have herein shown and described preferred embodiments of my invention, it is nevertheless to be understood that various changes may be made therein, without departing from the spirit and scope of the appended claims.

What is claimed is:

1. A heating, cooling and ventilating system for an area of a building including a floor comprising panels, each having a lower insulating portion and an upper reflective portion, air conduits formed by said panels between said upper and lower portions, opposite terminals of said panels being beveled, closed ducts at each beveled end of said panels extending transversely of the latter lower extremities of said closed ducts being beveled for ready connection with the beveled terminals of said panels for in communication of said closed ducts with said air conduits, a plenum at one extremity of said floor adjacent to, and in communication with, one of said ducts, a heating and cooling unit within said plenum, air supply and exhaust means connected to said heating and cooling unit, a fan within said plenum superjacent said heating and cooling unit for directing air past the latter into one of said ducts through said air conduits in the floor panels to said duct remote from said plenum, means for selectively actuating said heating and cooling unit and said fan for a cooling or heating operation, a vent in said duct remote from said plenum for admitting air to the area, and a return vent in said plenum to permit air within the space to be heated or cooled to be drawn into the plenum for recirculation, and a fresh air intake in communication with said plenum for admixing fresh air with the air drawn into said plenum through said return vent.

2. The heating, cooling and ventilating system of claim 12 with the addition of a control switch operatively connected to said fan for operating the latter independently of said heating and cooling unit, to effect ventilation of said area.

3. A heating, cooling and ventilating system for an area of a building, including combination floor and air duct panels arranged with the air duct passages extending longitudinally of the area, the opposite longitudinal terminals of said panels being beveled, transverse header ducts in communication with the beveled panel terminals, the lower portion of each header duct being beveled for ready connection with the beveled terminals of said panels, air treating means adjacent to and in communication with, one of said header ducts, means for directing air through said air treating means to said header duct adjacent thereto, through said floor and air duct panels to said other header duct, a fresh air inlet in communication with said one header duct, and vent means in said other header duct for delivering air to the area.

4. The heating, cooling and ventilating system of claim 3, with the addition of a return vent in the area in communication with said air treating means.

5. The heating, cooling and ventilating system of claim 3, wherein each of said panels includes an upper portion constructed of a reflective material throughout, and a lower portion constructed of an insulating material throughout.

References Cited by the Examiner

UNITED STATES PATENTS

| | | | |
|---|---|---|---|
| 1,750,491 | 3/1930 | Putnam | 50—127 |
| 2,155,256 | 4/1939 | Crago | 165—27 |
| 2,195,691 | 4/1940 | Burt | 237—69 |
| 2,225,244 | 12/1940 | Anderson | 237—69 |
| 2,505,622 | 4/1950 | McKee | 237—1 |
| 2,621,027 | 12/1952 | Tatsch | 237—69 X |
| 2,641,449 | 6/1953 | Antony | 50—263 X |
| 2,669,393 | 2/1954 | Schleicher | 98—31 X |
| 2,726,593 | 12/1955 | Lahti | 237—69 X |
| 2,971,747 | 2/1961 | Young | 237—50 X |

EDWARD J. MICHAEL, *Primary Examiner.*

PERCY L. PATRICK, JAMES W. WESTHAVER,
*Examiners.*